No. 736,950. PATENTED AUG. 25, 1903.
J. W. FORSTER.
INCANDESCENT ELECTRIC LAMP.
APPLICATION FILED APR. 17, 1901.
NO MODEL.

Witnesses:
Inventor,
James W. Forster,
By Thomas F. Sheridan
Atty.

No. 736,950.                                                  Patented August 25, 1903.

UNITED STATES PATENT OFFICE.

JAMES W. FORSTER, OF CHICAGO, ILLINOIS, ASSIGNOR TO MODERN ELECTRIC LIGHT CO., A CORPORATION OF NEW JERSEY.

INCANDESCENT ELECTRIC LAMP.

SPECIFICATION forming part of Letters Patent No. 736,950, dated August 25, 1903.

Application filed April 17, 1901. Serial No. 56,234. (No model.)

*To all whom it may concern:*

Be it known that I, JAMES W. FORSTER, a citizen of the United States, residing at Chicago, in the county of Cook and State of Illinois, have invented certain new and useful Improvements in Incandescent Electric Lamps, of which the following is a specification.

This invention relates to that class of lamps which are adapted to be used in connection with a current of electricity for the purpose of translating the same into light, and particularly to the construction and arrangement of the globe which holds the carbon filament, all of which will more fully hereinafter appear.

The principal object of the invention is to provide a simple, economical, and efficient lamp.

A further object of the invention is to provide a simple, economical, and efficient incandescent lamp-bulb made of two or more sections, formed of glass and secured together, forming separate chambers separated by a wall of double thickness at the inner side of the base and having terminal wires extending directly through such thickened wall of the base from the vacuum-chamber and through the thick portions at the butt-end of such base within a metallic screw-cap thereon for minimizing the breakage in construction and while in use and forming a substantial and efficient lamp.

A further object of the invention is to provide a simple, economical, and efficient incandescent lamp made in two or more sections, forming separate chambers, one only of which is a vacuum-chamber, so as to reduce the heating effect thereof, as will more fully hereinafter appear.

The invention consists principally in the combination of a glass base providing an independent chamber and an inclosing glass bulb secured thereto to provide a hermetically-sealed vacuum-chamber.

The invention consists, further, in the combination of a glass base provided with a forwardly-projecting cartridge-shaped projection forming a cooling-chamber and a bulb portion separately secured thereto forming a hermetically-sealed vacuum-chamber.

The invention consists, further and finally, in the features, combinations, and details of construction hereinafter described and claimed.

Figure 1:
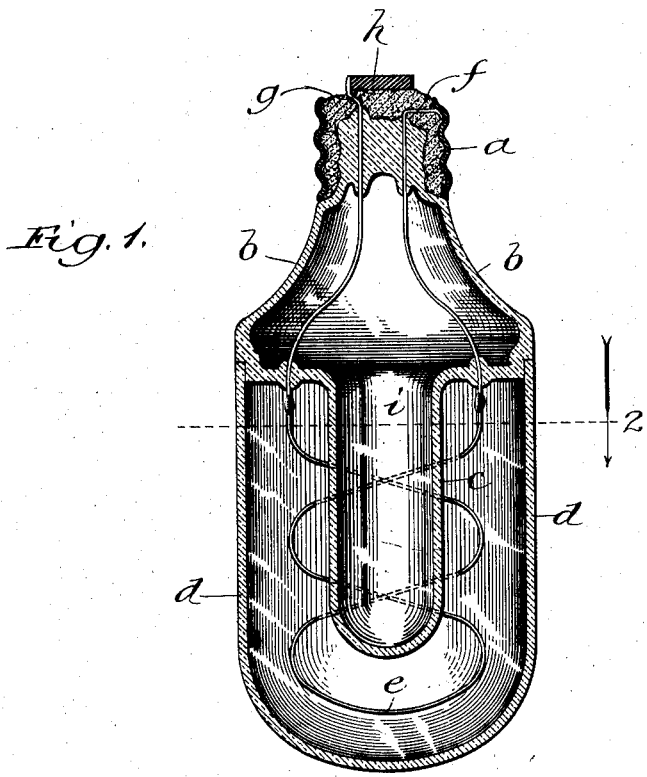
Figure 2:
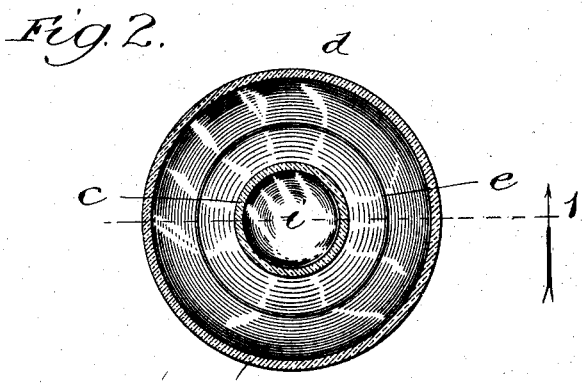

In the accompanying drawings, Figure 1 is a full-sized longitudinal sectional elevation of one form of burner constructed in accordance with these improvements, taken on line 1 of Fig. 1; and Fig. 2, a cross-sectional view taken on line 2 of Fig. 1 looking in the direction of the arrow.

In the art to which this invention belongs it is well-known that the use of incandescent lamps has entered largely into the economic conditions of the world's market and that they are continually extending their sphere of action, every little improvement that is added thereto in the way of making the lamp more efficient, simpler, or more economical to run being one that will assist in extending its influence, all of which is desired by both the manufacturer and user.

As above suggested, the principal object of this invention is to provide an incandescent lamp that will be so constructed and arranged that it will not radiate as much heat, or, in other words, that the outer globe will be far cooler than the inner—one that can be readily repaired when the ordinary filament is worn out by merely separating the bulb from the base and providing a new filament, all of which will more fully hereinafter appear.

In constructing a lamp in accordance with my improvements I take and use the ordinary screw-cap $a$, which is formed of brass or similar material and adapted to be put into the usual lamp-socket for the purpose of removably holding the lamp in place. This cap is provided with what I term a "base" portion $b$, also formed of glass and provided with a forwardly-extending cartridge-shaped projecting portion $c$, somewhat resembling a tube. This base portion is cemented into the cap portion in the usual manner, and the glass of which both the base and tip are made may be opaque, the outer globe being transparent. To provide for the lamp proper or the "vacuum-chamber," as it might more correctly be termed, a bulb portion $d$ is provided substantially U-shaped in longitudinal section and secured to the base, as shown in Fig. 1, in any desired manner, either by the use of a glass-cement, or when the glass used is of the kind that will permit a glass-blower's pipe can be used to "braze" (as it might be termed) them together, though I prefer to use a glass-cement to connect the base and bulb together, so as to hermetically seal the vacuum-chamber, from which the air or the major portion thereof is exhausted in the ordinary manner. The opening through which the air is exhausted may be made through the end of the globe opposite the base and sealed by fusing the glass, all in the ordinary manner common and well known to those skilled in the art and which therefore need not be described here. The usual carbon filament $e$ is used and secured to the terminal wires $f$ and $g$, one of which leads to the cap and the other to a plug $h$, as shown particularly in the drawings. By this arrangement the terminal wires pass from the vacuum-chamber directly into and through the base portion at some distance from the inwardly-projecting tube and into and through the butt-end of the base, where the material is of comparatively great thickness and surrounded by the metallic cap. The points of the base through which the wires pass from within the globe are also reinforced, as shown in the drawings, so as to be thicker than the walls of the inwardly-projecting tube, all of which results in materially strengthening the base and its connections with the wires, makes a substantial seat for the wires, greatly reduces the percentage of breakage in manufacture and while in use brings the incandescent filament clear down to the base, thus increasing its proportional length and enabling it to encircle the inner tube throughout the entire length of such tube and forms a thick wall between the separate chambers.

The air is not exhausted from within the inner tube nor from within the base. The tube and base thus absorb the heat to a considerable extent, leaving the globe cooler than it would otherwise be. The base portion, as above set forth, is constructed in a hollow manner, so as to provide what I prefer to term a "cooling-chamber" $i$, that in my experimental tests seemed to relieve the bulb portion from the usual heat of the incandescent lamp.

I claim—

1. In a lamp of the class described, the combination of a hollow base portion provided with a hollow cartridge-shaped projecting portion together forming an independent chamber and having a relatively thick annular wall extending outward from the base of such cartridge-shaped projecting portion, a metallic cap secured to and inclosing the butt-end of the base portion, an outer glass bulb secured to such base portion and forming an independent hermetically-sealed vacuum-chamber surrounding the cartridge-shaped projecting portion of the base, terminal wires extending through the butt-end of the base within the inclosing cap and through the inner wall of the base into the vacuum-chamber at points near the base of the cartridge-shaped projecting portion and at a distance therefrom, and a resistance-filament secured to the terminal wires within the vacuum-chamber near the base of the cartridge-shaped projecting portion at a distance therefrom and arranged to encircle such portion, substantially as described.

2. In a lamp of the class described, the combination of a metallic attaching-cap, an enlarged glass base $b$ provided with a forwardly-projecting cartridge-shaped portion $c$ forming a cooling-chamber, a glass bulb secured to the base and forming in connection therewith a hermetically-sealed vacuum-chamber separate from the chamber in the base, terminal wires leading through the cooling-chamber, and a resistance-filament secured to the terminals within the vacuum-chamber at the base of and outside of the cartridge-shaped portion, substantially as described.

JAMES W. FORSTER.

Witnesses:
MORRISON C. COLYER,
CHARLES M. LUM.